United States Patent Office 3,396,174
Patented Aug. 6, 1968

3,396,174
PROCESS FOR THE PREPARATION OF SUBSTITUTED 1,3-OXATHIOL-2-ONES
Ernst Mühlbauer and Wolfgang Weiss, Cologne-Stammheim, Germany, assignors to Farbenfabriken Bayer Aktiengesellschaft, Leverkusen, Germany, a corporation of Germany
No Drawing. Filed Jan. 3, 1966, Ser. No. 517,930
Claims priority, application Germany, Mar. 18, 1965, F 45,554
7 Claims. (Cl. 260—327)

ABSTRACT OF THE DISCLOSURE

A process for producing substituted 1,3-oxathiol-2-ones by contacting a carbonyl halogen sulphenyl halide of the formula Hal—CO—S—Hal wherein Hal is halogen, with an oxo compound of the formula $R_1$—CO—$CH_2$—$R_2$ in which the $R_1$ and $R_2$ radicals may, by example, be alkyl, cycloalkyl, aryl and a heterocyclic such as thiophene and furan; the reaction being effected with at least a stoichiometric amount of the reactants and at a temperature of about —20° to about 250° C. The products are useful as fungicides.

---

It has been found that substituted 1,3-oxathiol-2-ones may be obtained by reacting carbonyl halogen-sulphenyl halides of the general formula Hal—CO—S—Hal in which Hal stands for the same or different halogen atoms such as bromine or chlorine, with oxo compounds of the general formula $R_1$—(CO—$CH_2$ $R_2$)$_n$ in which $n$ is 1 or 2 and in which
$R_1$ and $R_2$ individually stand for alkyl (preferably with 1–18 carbon atoms), cycloalkyl (preferably 5- and 6-carbon atoms in the ring system), alkylene (preferably with 1–8 carbon atoms), aryl (preferably phenyl and naphthyl), aralkyl (preferably benzyl and menaphthyl) or a heterocyclic radical (preferably thiophene or furan);
$R_2$ may also be hydrogen or halogen (fluorine, chlorine, bromine, iodine); and
$R_1$ and $R_2$ may be defined in combination to form an iso- or heterocyclic ring of 5 or 6 members in a hetero ring system with one sulphur or oxygen as hetero atom.

$R_1$ and $R_2$, as individually defined above, may be optionally substituted one or several times by the same or different substituents.

The following are included as substituents for $R_1$ and $R_2$:

Halogen (such as fluorine, chlorine, bromine or iodine), nitro, sulphonic acid, alkylsulphonyl (with 1–18 carbon atoms),
Arylsulphonyl (preferably phenyl or naphthyl), sulphonic acid ester (methyl, ethyl or butyl), sulphamyl, phenyl, carbalkoxy (alkyl with preferably 6 carbon atoms), carbaroxy (preferably phenyl or naphthyl), cyano, alkoxy (alkyl with 1 to 18 carbon atoms), aroxy (preferably phenyl or naphthyl), alkylmercapto (with 1 to 12 carbon atoms), arylmercapto (preferably phenyl, or naphthyl), alkylsulphoxy (alkyl with 1 to 12 carbon atoms) or arylsulphoxy groups (preferably phenyl or naphthyl).

The following are examples of suitable oxo compounds which may be used in the process: Acetone, methylethyl ketone, diethyl ketone, pentane-2,3-dione, hexane-2,4-dione, hexane-2,5-dione, β-chloroethylethyl ketone, methyl vinyl ketone, cyanoacetonate, acetylacetone, ethyl acetoacetate, acetone-dicarboxylic acid ester, dimedon, cyclohexane-1,3-dione, cyclopentane-1,3-dione, acetyl cyclohexane, acetylcyclohexanone, acetyldecalin, m-nitro-acetophenone, p-chloroacetophenone, acetophenone, ω-chloroacetophenone, diacetylbenzene, acetylpropiophenone, acetylstilbene, stearoylbenzene, propiophenone, benzoyl acetophenone, benzoylacetone, benzoylacetic acid ester, dibenzoyl acetone, benzoyl acetoacetic acid ester, benzoyl acetonitrile, desoxybenzoin, dibenzoylethane, acetylbenzoylacetone, acetylnaphthalene, acetylanthracene, acetylphenanthrene, 4-oxotetrahydropyrane, 4-oxo-1-thiotetrahydropyrane, 1 - thiotetrahydropyrone - (4)-S-dioxide, 6-chloro - 3 - oxo-dihydrothionaphthene, 5-chloro-3-oxocumaran, desoxycuminoin, desoxypiperoin, desoxyfuroin, 2-acetylfuran, acetyltetrahydrofuran, 5-ethyl - 3 - acetylfuran, 2-acetylthiophene, 2-acetyl-tetrahydrothiophene, 2-propionylthiophene, 2-methyl-5-acetylthiophene, acetylbenzocumarin, acetylcumaran, acetylcumarin, acetylcumarone, acetyldimethylpyrrole, acetylfluorenecarboxylic acid ethyl ester, acetylindane, acetylindene, acetylnaphthol, diacetylacetone, diacetylbutane, diacetyldiphenyl, diacetyldiphenylether, diacetyldiphenylmethane, triacetylmethane, triacetylethane, 2-oxo-propane - 1 - phosphoric acid dimethyl ester or the dimethyl ester or diethyl ester of 1,1-di-methyl-3-oxo-butane-1-phosphonic acid.

The carbonylhalogensulphenyl halides used for the process can be obtained according to an earlier proposal of the applicant. Their preparation will be explained below with reference to carbonyl chlorosulphenyl chloride, which is the preferred compound, by way of example:

211 (approximately 200) ml. conc. $H_2SO_4$, 18 g. water and 186 g. (1 mol) trichloromethylsulphenyl chloride are vigorously stirred and heated to 45 to 50° C. At the end of 1 to 1½ hours, almost 2 mols of HCl have been split off and evolution of HCl slows down. The two layers of the reaction mixture are separated in a separating funnel. The lighter phase constitutes the crude product which already has a high degree of purity. It can be purified still further by distillation.

The carbonyl chlorosulphenyl chloride boils at B.P. 760 mm., 90° C.; $n_D^{20.5}$=1.5158.

The process will now be explained using as an example the reaction of carbonyl chlorosulphenyl chloride with diethylketone:

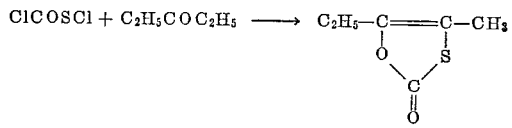

The molar ratios of the reactants are preferably such that one equivalent of carbonyl halogen sulphenyl halide is available per equivalent of oxo group. However, the process can also be carried out using an excess of one of the two components.

The reaction is carried out at temperatures of about —20 to about 250° C., preferably 0 to 150° C. It is immaterial whether the oxo compound is added to the carbonyl halogen sulphenylhalide or conversely. The reaction time is about 30 minutes to about 20 hours, depending on the reactivity of the oxo compound used, and is preferably about 1 to 5 hours.

The process may be carried out in the presence or absence of solvents. If the reaction is carried out using solvents, it is preferable to use solvents which do not react or only react slowly with the two reactants. Examples of such solvents are: Hydrocarbons such as petroleum ether, light petroleum, pentane, hexane, isooctane, benzene, toluene, xylene, chlorinated hydrocarbons such as methylene chloride, dichloroethane, chloroform, carbon tetrachloride, chlorobenzene, dichlorobenzene, ethers such as diethylether, dioxane or diphenylether. The reaction is generally carried out at normal pressure but elevated pressures of up to about 10 atmospheres excess pressure may be employed if desired. The reaction products are worked up by the usual methods. The 1,3-oxathiol-2-ones which can be prepared by the process are new and can be used as intermediate products for the production of dyes and plant protective agents.

The compounds may, however, also be used directly as plant protective agents, as will be seen from, for example, the particulars given hereinafter for (a) 5-phenyl-1,3-oxathiolone-(2),
(b) 4-methyl-5-phenyl-1,3-oxathiolone-(2), or
(c) 4-acetyl-5-methyl-1,3-oxathiol-2-one.

These compounds have a powerful fungitoxic action.

100 mg. of the substances in 1 litre of potato-dextrose-agar prevent all mycelium growth in the following fungi:

(a) 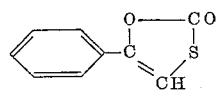

*Corticium rolfsii, Sclerotinia sclerotiorum, Thielaviopsis basicola, Phytophthora cactorum, Fusarium culmorum* and *Fusarium oxysporum*, (b) 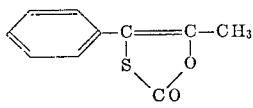

*Corticium rolfsii, Sclerotinia sclerotiorum* and *Fusarium oxysporum*, (c) 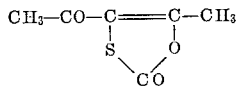

*Corticium rolfsii, Sclerotinia sclerotiorum, Thielaviopsis basicola* and *Phytophthora cactorum*.

When applied as dry disinfecting agent in an amount of 600 mg. on to wheat seed, compounds (a) and (b) almost completely prevent germination of the spores of bunt and can therefore be used for combating this grain disease.

Compounds (a) and (b) can also be used as soil treating agents against phytopathogenic soil fungi. For example, 100 mg. of the preparations in a litre of soil infested with *Rhizoctonia solani* and *Fusarium culmorum* will keep pea plants substantially healthy where unprotected plants would almost all become diseased and die.

The other compounds prepared by the present process are also effective fungicides.

The following examples illustrate the invention.

Example 1

In a 500 cc. three necked flask with stirrer, thermometer and reflux cooler, 43.00 g. (0.5 mol) of diethyl ketone and 65.50 g. (0.5 mol) of carbonyl chlorosulphenyl chloride are slowly heated to about 80° C. with exclusion of moisture and with constant stirring until evolution of hydrogen chloride sets in. When most of the hydrogen chloride has been split off, the reaction mixture is heated up to 100° C. in the course of an hour and the dark coloured reaction product is then fractionally distilled in vacuo. Pure 4-methyl-5-ethyl-1,3-oxathiolone-(2) of the formula

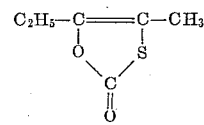

of B.P. 68° C./0.9 mm. Hg is obtained. The yield is 54.6 g. (=75.3% of theoretical).

$C_6H_8O_2S$ (144.96), calculated: C, 49.97%; H, 5.59%; O, 22.19%; S, 22.24%. Found: C, 50.03%; H, 5.59%; O, 22.20%; S, 22.70%.

Example 2

A mixture of 60.07 g. (0.5 mol) of acetophenone and 65.50 g. (0.5 mol) of carbonyl chlorosulphenyl chloride is heated to 90 to 100° C. with stirring and exclusion of atmospheric moisture until evolution of hydrogen chloride sets in. For the next 3 to 4 hours, the reaction mixture is heated so that the sump temperature rises to 125 to 130° C. The reaction mixture is then subjected to a fractional vacuum distillation. After a small amount of first runnings, 5-phenyl-1,3-oxathiolone-(2) of the formula

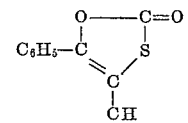

is obtained in a yield of 60.0 g. (=67.4% of the theoretical). B.P 148 to 156° C./2.5–3 mm. Hg. The substance can be recrystallised from a little acetone with only slight loss and then melts at 76.5° C.

$C_9H_6O_2S$ (178.21) calculated: C, 60.70%; H, 3.39%; O, 17.96%; S, 18.00%. Found: C, 60.66%; H, 3.61%; O, 18.35%; S, 17.65%. Molecular weight calculated: 178.21. Found: 180/178 (determined by osmotic methods in acetone).

Example 3

By the method described in Example 2, 67.00 g. (0.5 mol) of propiophenone and 65.50 g. (0.5 mol) of carbonyl chlorosulphenyl chloride are slowly heated to 100 to 130° C. in a flask equipped with a stirrer with exclusion of atmospheric moisture. By fractional vacuum distillation of the reaction product, 4-methyl-5-phenyl-1,3-oxathiolone-(2) of the formula

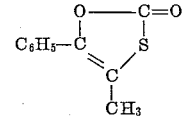

is obtained in a yield of 70 g. (=72.90% of the theoretical). B.P. 140° C./1.3 mm. Hg.

$C_{10}H_8O_2S$ (192.24) calculated: C, 62.48%; H, 4.20%; O, 16.65%; S, 16.68%. Found: C, 62.77%; H, 4.41%; O, 16.89%; S, 16.65%. Molecular weight calculated: 192.24. Found: 193 (cryoscopically in dioxane).

Example 4

65.07 g. (0.5 mol) ethyl acetoacetate and 65.50 g. (0.5 mol) carbonyl chlorosulphenyl chloride are heated to about 90 to 100° C. in a flask of 500 cc. capacity equipped with stirrer, with exclusion of air and moisture and constant stirring until liberation of hydrogen chloride sets in. The temperature is increased to 120° C. in the course of 4 to 5 hours and the reaction mixture is then distilled in vacuo. After a first running, 4-ethoxycarbonyl-5-methyl-1,3-oxathiolone-(2) of the formula

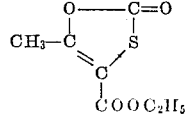

is obtained in a yield of 38 g. (=40.4% of theoretical). B.P. 116° C./3.5 mm. Hg.

C₇H₈O₄S (188.21) calculated: C, 44.67%; H, 4.29%; O, 34.00%; S, 17.04%. Found: C, 44.98%; H, 4.25%; O, 34.38%; S, 16.80%.

Example 5

In a 500 cc. flask with a stirrer, 101.05 g. (0.5 mol) acetone-1,3-bis-(ethyl carboxylate), 100 cc. toluene and 65.50 g. (0.5 mol) carbonyl chlorosulphenyl chloride are slowly heated to about 70° C. with stirring and exclusion of moisture until brisk evolution of hydrogen chloride takes place. Over the next 2 to 3 hours, the temperature is raised to 90 to 100° C. while the reaction mixture is stirred constantly. The reaction mixture is then fractionally distilled in vacuo. 4-ethoxycarbonyl-5-(ethoxycarbonylmethyl)-1,3-oxathiolone-(2) of the formula

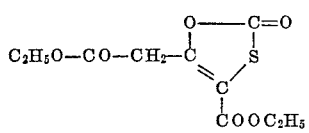

is obtained. The yield is 47.5 g. (=36.5% of the theoretical). B.P. 128 to 134° C./0.5 to 0.65 mm. Hg.

C₁₀H₁₂O₆S (260.27) calculated: C, 46.15%; H, 4.65%; O, 36.89%; S, 12.32%. Found: C, 46.60%; H, 4.96%; O, 35.92%; S, 12.20%. Molecular weight calculated: 260.27. Found: 259 (cryoscopically in dioxane).

Example 6

In a 500 cc. flask equipped with a stirrer, a mixture of 96.10 g. (0.5 mol) ethyl benzoyl acetate and 65.50 g. (0.5 mol) carbonyl chlorosulphenyl chloride are slowly heated to 80 to 90° C. with stirring until evolution of hydrogen chloride set in. The temperature is raised to 130° C. in the course of 2 to 3 hours. The resulting reaction product yields, on fractional vacuum distillation, 4-ethoxycarbonyl - 5 - phenyl-1,3-oxathiolone-(2) of the formula

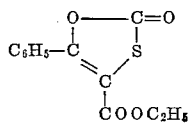

which solidifies in the receiver. B.P. 164–171° C./1.6 to 0.7 mm. Hg.

The compound can be recrystallised from alcohol and has a melting point of 59 to 62° C.

The yield after recrystallisation is 82 g. (=65.5% of theoretical).

C₁₂H₁₀O₄S (250.28) calculated: C, 57.59%; H, 4.03%; O, 25.57%; S, 12.81%. Found: C, 57.41%; H, 4.06%; O, 26.18%; S, 12.55%.

Example 7

As described in Example 5, 50.06 g. (0.5 mol) acetyl acetone and 65.5 g. (0.5 mol) carbonyl chlorosulphenyl chloride in 200 ml. toluene are heated for 3 hours, with stirring, to 90° C., ring closure taking place during this operation. After removal of the solvent, the product is fractionated in vacuo. 41.5 g. (=26.25% of theoretical) of 4-acetyl-5-methyl-1,3-oxathiol-2-one of the formula

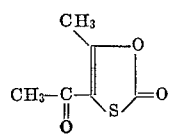

are obtained. B.P. 140° C./12 mm. Hg. The melting point of this compound lies at 63 to 65° C.

C₆H₆O₃S (158.18) calculated: C, 45.56%; H, 3.82%; O, 30.35%; S, 20.27%. Found: C, 45.71%; H, 3.89%; O, 29.97%; S, 20.50%.

Example 8

In a manner described in Example 5, 29 g. (0.5 mol) acetone and 65.5 g. (0.5 mol) carbonyl chlorosulphenyl chloride in 100 ml. hexane (instead of toluene) are heated under reflux for about 8 hours, during which operation hydrogen chloride is split off and ring formation takes place. The hexane is then distilled off and the residue fractionated in vacuo. The fraction which passes over at 50° C./1 mm. Hg consists of pure 5-methyl-1,3-oxathiolone-(2) of the formula

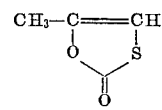

The yield is 34 g. (58.6% of the theoretical).

C₄H₄O₂S (molecular weight 116.14) calculated: C, 41.37%; H, 3.47%; O, 27.55%; S, 27.61%. Found: C, 41.30%; H, 3.59%; O, 27.86%; S, 27.25%.

Example 9

In a manner analogous to Example 5, 81.1 g. (0.5 mol) benzoyl acetone and 65.5 g. (0.5 mol) carbonylchlorosulphenyl chloride in 100 ml. toluene are slowly heated to boiling with constant stirring. After a reaction time of about 6 hours, the toluene is distilled off. On fractional distillation in vacuo, the residue yields a main fraction at 141 to 143° C./0.5 to 0.6 mm. Hg which consists of pure 4-acetyl-5-phenyl-1,3-oxathiolone-(2) of the formula

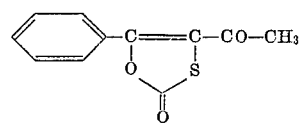

The yield is 105 g. (95.5% of theoretical).

C₁₁H₈O₃S (molecular weight 220.25) calculated: C, 59.99%; H, 3.66%; O, 21.79%; S, 14.56%. Found: C, 57.74%; H, 3.88%; O, 21.76%; S, 14.95%. Molecular weight (calculated in dioxane): 220. Found: 223.

Example 10

In a manner analogous to Example 5, 85.1 g. (0.5 mol) 2-acetylnaphthalene and 65.5 g. (0.5 mol) carbonyl chlorosulphenyl chloride in 100 ml. toluene are reacted for 6 to 8 hours at 70 to 110° C. with stirring. When the toluene has been distilled off, a yellowish brown crystalline residue of 5-(β-naphthyl)-1,3-oxathiolone-(2) of the formula

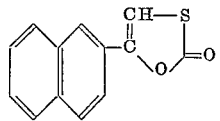

remains behind. The compound can be recrystallised from toluene using active charcoal and is practically colourless. The yield of pure material is 68 g. (59.7% of theoretical). M.P. 126° C.

C₁₃H₈O₂S (molecular weight 228.27) calculated: C, 68.40%; H, 3.53%; O, 14.02%; S, 14.05%. Found: C, 68.12%; H, 3.54%; O, 14.35%; S, 14.15%.

Example 11

As described in Example 5, 85.1 g. (0.5 mol) 1-acetylnaphthalene are reacted with 65.5 g. (0.5 mol) carbonylchlorosulphenyl chloride in 100 ml. toluene by heating at 70 to 100° C. for about 6 hours with stirring. The toluene is then distilled off and the dark coloured residue, which slowly crystallises, is recrystallised from alcohol with the addition of active charcoal. 78 g. (68.4% of theoretical) of colourless 5-(α-naphthyl)-1,3-oxathiolone-(2) of the formula

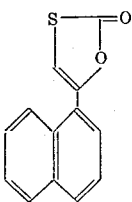

are obtained in this way. M.P. 79° C.

$C_{13}H_8O_2S$ (molecular weight 228.27) calculated: C, 68.40%; H, 3.53%; O, 14.02%; S, 14.05%. Found: C, 68.90%; H, 3.80%; O, 14.00%; S, 13.40%.

Example 12

In a manner analogous to Example 5, 98.1 g. (0.5 mol) desoxybenzoin are reacted with 65 g. (0.5 mol) carbonyl chlorosulphenyl chloride in 100 ml. toluene by stirring for 6–8 hours at 80–110° C. When removal of the solvent by distillation has been effected, about 120 g. of crude 4,5-diphenyl-1,3-oxathiolone-(2) of the formula

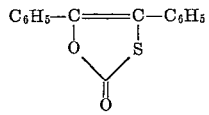

are obtained which can be effectively purified by fractional distillation in vacuo. The compound boils at 144 to 146° C./0.5 mm. Hg. The yield of pure substance is 76.3 g. (60.0% of theoretical).

$C_{15}H_{10}O_2S$ (molecular weight 254.32) calculated: C, 70.84%; H, 3.96%; O, 12.58%; S, 12.61%. Found: C, 70.91%; H, 4.23%; O, 12.39%; S, 12.50%.

Example 13

With constant stirring and exclusion of atmospheric moisture, 65.5 g. (0.5 mol) carbonyl chlorosulphenyl chloride are slowly added dropwise to a solution of 63.1 g. (0.5 mol) 2-acetylthiophene in 100 ml. toluene. During this operation, the temperature rises to about 38° C. The reaction mixture is now slowly heated until evolution of HCl sets in. When the major portion of hydrogen chloride has been split off (about 3 hours) the remaining reaction mixture is boiled for a further 1 to 2 hours under reflux and the toluene is then distilled off. The residue is fractionally distilled in vacuum. After a small amount of first runnings, 5-(2'-thiophenyl)-1,3-oxathiolone-(2) of the formula

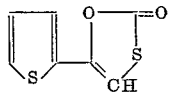

distills over at 120° C./0.7 mm. Hg and crystallises in the receiver. The yield is 75 g. (81.5% of theoretical). After recrystallisation from alcohol with addition of active charcoal, the compound melts at 56° C.

$C_7H_4O_2S_2$ (molecular weight 184.24) calculated: C, 45.63%; H, 2.19%; O, 17.37%; S, 34.81. Found: C, 45.90%; H, 2.35%; O, 17.40%; S, 34.85%.

Example 14

49.10 g. (0.5 mol) cyclohexanone and 65.5 (0.5 mol) carbonyl chlorosulphenyl chloride are reacted in 100 ml. hexane as described in Example 8. 67.5 g. (86.5% of theoretical) of crude 4,5-tetramethylene-1,3-oxathiol-2-one of the formula

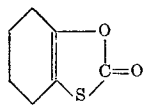

are obtained. B.P. 78 to 80° C./0.25 mm. Hg.

$C_7H_8O_2S$ (molecular weight 156.21) calculated: C, 53.82%; H, 5.16%; O, 20.49%; S, 20.53%. Found: C, 54.36%; H, 5.48%; O, 20.37%; S, 19.70%.

Example 15

65.5 g. (0.5 mol) carbonyl chlorosulphenyl chloride are added dropwise, with stirring and with exclusion of atmospheric moisture, to a solution, heated to 65° C., of 70.1 g. (0.5 mol) dimedon (1,1-dimethylcyclohexane-3,5)-dione in 500 ml. dry dioxane. The reaction mixture is then heated for 4 hours at 80 to 90° C. during which time ring closure takes place. When cold, the solution is separated by suction filtration from small quantities (about 5 g.) of a compound melting at 230° C. and it is then highly concentrated in vacuo. By recrystallising the residue from hexane, 34 g. of pure tetrahydro-4-oxodimethyl-benz-1,3-thiol-2-one of the formula

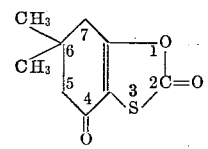

are obtained. M.P. 52° C.

$C_9H_{10}O_3S$ (molecular weight 198.25) calculated: C, 54.53%; H, 5.08%; O, 24.21%; S, 16.18%. Found: C, 54.66%; H, 5.58%; O, 24.17%; S, 16.05%. Molecular weight osmotically in acetone: 198.25.

What we claim is:

1. A process for the production of substituted 1,3-oxathiol-2-ones, which comprises reacting a carbonyl halogen sulphenyl halide of the formula

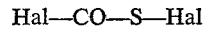

in which

Hal individually represents a member selected from the group consisting of chloro and bromo, with an oxo compound of the formula

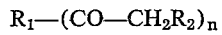

$n$ is an integer of 1–2;

$R_1$ and $R_2$ are individual members selected from the group consisting of alkyl, cycloalkyl of 5–6 carbon atoms in the ring system, alkylene of 1–4 carbon atoms, aryl, aralkyl, a 2-thiophenyl and 2-furanyl, and corresponding substituted radicals containing as substituents a member selected from the group consisting of halo, nitro, sulphonic acid, alkylsulphonyl having 1–18 carbon atoms, arylsulphonyl, a lower alkyl sulphonic acid ester, sulphamyl, phenyl, carbalkoxy alkyl, carbaroxy, cyano, alkoxy, aroxy, alkylmercapto, arylmercapto, alkylsulphoxy, and arylsulphoxy;

$R_2$ is further defined as a member selected from the group consisting of hydrogen and halo; and $R_1$ and $R_2$ in combination are defined as a 5–6 membered iso ring or heterocyclic ring, the heterocyclic ring having one hetero atom selected from the group consisting of sulphur and oxygen; and recovering the resulting product.

2. A process as claimed in claim 1, in which the carbonyl halogen sulphenyl halide is reacted with the oxo compound in such a ratio that one equivalent of carbonyl sulphenyl halide is present per equivalent of oxo group.

3. The process of claim 2 wherein $R_1$ and $R_2$ are individually members selected from the group consisting of alkyl of 1–18 carbon atoms, cycloalkyl with 5–6 carbon atoms in the ring, phenyl, naphthyl, benzyl, menaphthyl, thiophene and furan.

4. A process as claimed in claim 1, in which the reaction is effected at a temperature of about −20 to 250° C.

5. A process as claimed in claim 2, in which the reaction is effected at a temperature of about 0°–150° C.

6. A process as claimed in claim 1, in which the reaction is carried out in the presence of a solvent which is inert or substantially inert to the reactants.

7. A process as claimed in claim 4, in which the reaction is carried out in the presence of a solvent which is inert or substantially inert to the reactants.

References Cited

FOREIGN PATENTS 648,456  11/1964  Belgium.

OTHER REFERENCES

Horsfall: Principles of Fungicidal Action, Chronica Botanica Company, Waltham, Mass. (1956), page 210.

Lightner et al.: Chemical Abstracts, vol. 60 (1964), page 5586f.

JAMES A. PATTEN, *Primary Examiner.*